C. H. LANE AND J. H. STEELE.
NAME PLATE.
APPLICATION FILED JULY 31, 1919.

1,340,778.

Patented May 18, 1920.

Inventors
Charles H. Lane
and John H. Steele

UNITED STATES PATENT OFFICE.

CHARLES H. LANE AND JOHN H. STEELE, OF PORTLAND, OREGON.

NAME-PLATE.

1,340,778. Specification of Letters Patent. Patented May 18, 1920.

Application filed July 31, 1919. Serial No. 314,453.

*To all whom it may concern:*

Be it known that we, CHARLES H. LANE, a citizen of the United States, and JOHN H. STEELE, a citizen of Canada, residing at Portland, in the county of Multnomah and State of Oregon, have invented certain new and useful Improvements in Name-Plates, of which the following is a specification.

The primary intent of this invention is the provision of means for securing a name plate to the body of an automobile or like vehicle, the body of which is constructed of sheet metal. Obviously the invention is adapted for securing any device to sheet metal, the rear of which is not readily accessible.

Automobiles and like vehicles generally have their body constructed of sheet metal and to attach a plate or other article to the body is difficult because access to the rear may not be readily had, because of the upholstering and other furnishings applied to the inner side of the body.

The drawing illustrates a preferred embodiment of the invention. However, it is to be understood that in adapting the same to meet different conditions, various changes in the form, proportion, and minor details of construction may be resorted to, without departing from the nature of the invention as claimed hereinafter.

Referring to the drawing.

Corresponding and like parts are referred to in the following description and indicated in the several views of the drawing by like reference characters.

Figure 1:
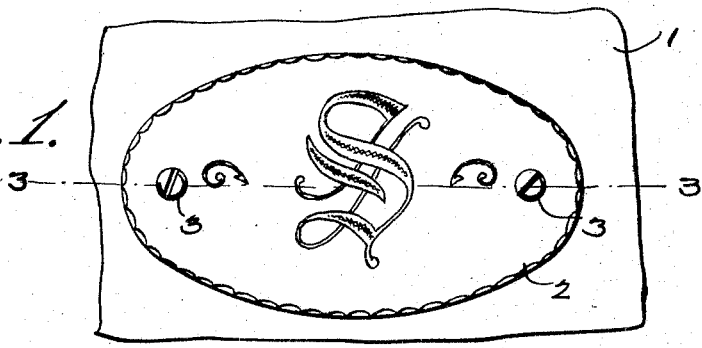
Figure 1 is an elevation of a name plate secured in position in accordance with the invention.
Figure 2:
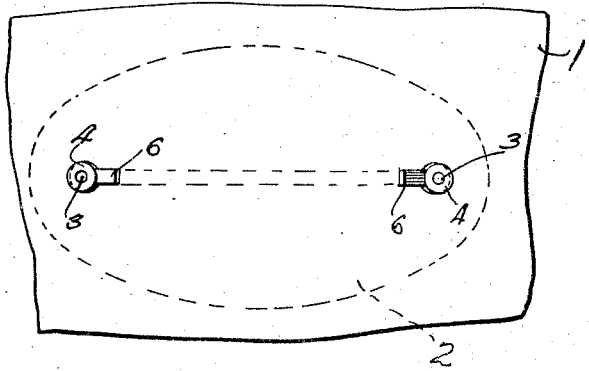
Fig. 2 is a view of the reverse side of the parts illustrated in Fig. 1.

The numeral 1 designates sheet metal which may be a suitable part of the body of an automobile or other vehicle and 2 represents the name plate or like part to be attached thereto. The fastening means consist of bolts 3 and nuts 4. The plate 2 is provided near opposite ends with openings to receive the bolts 3, said openings being of a size to prevent the passage of the heads of the bolts thereto. It is to be understood that the nuts 4 have a loose fit on the bolts 3 to admit of assembling the parts. Openings 5 are formed in the sheet metal 1 in position to register with the openings formed in the plate 2, so as to receive the bolts 3. The openings 5 are of a size to correspond with the outline of the nuts 4, so that the latter may just pass therethrough. A retainer 6 coöperates with each bolt 3 and is adapted to pass through the opening 5 of the sheet metal 1. The retainer 6 is provided at one end with a head 7 which is adapted to be confined between the plate 2 and sheet metal 1, thereby holding the retainer in place. In the preferable construction, the retaining means consists of a metal strip which has its end portions bent substantially at a right angle, so that both bent portions may pass through the two openings 5 of the sheet metal 1. The body of the strip is indicated at 7 and is confined between the sheet metal and the plate 2.

Figure 3:
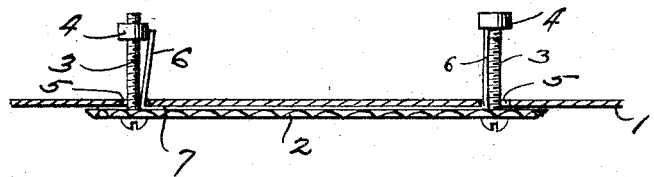
Fig. 3 is a horizontal section on the line 3—3 of Fig. 1, showing the plate in position and preliminary to being made secure.
Figure 4:
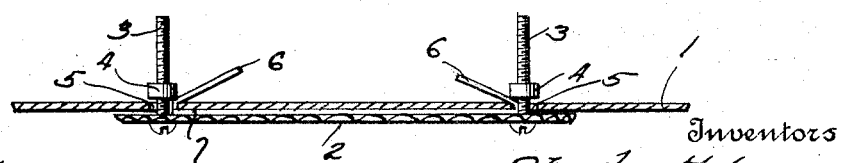
Fig. 4 is a view similar to Fig. 3 after the plate has been made secure.

When practising the invention, the name plate 2 with the end openings therein is placed against the outer side of the sheet metal 1 and the position of the openings in the name plate is marked on the sheet metal 1. The plate 2 is removed and openings 5 formed in the sheet metal 1 at the points indicated by the markings thereon, so as to register with the openings of the plate 2 in which the bolts 3 are located. The openings 5 formed in the sheet metal 1 must be of a size to snugly receive the nuts 4. The retainer is now placed in position against the rear side of the plate 2 with the retainer elements 6 against the inner sides of the bolts 3 and beneath the nuts 4, as indicated most clearly at the right hand of Fig. 3. The name plate 2 is now placed in position by passing the ends of the bolts 3 containing the nuts 4 through the openings 5. The retainer is held in place by the nuts 4 which engage the free ends of the elements 6. After the plate 2 has been pressed close against the outer side of the sheet metal 1, the bolts 3 are turned by means of a screw driver in a manner well understood, thereby causing the retainer elements 6 to be subjected to compressive action, whereby their free ends spring from under the nuts 4 and engage the sides thereof. The engagement between the nuts 4 and elements 6 is sufficient to prevent rotation of the nuts 4, during the turning of the bolts. As the bolts are turned, the nuts 4 are drawn inward against the rear side of the sheet metal 1, thereby deflecting the retainer elements 6 to a greater extent as the nuts 4 advance. Finally the nuts reach a position close against the rear side of the sheet metal 1 and the nuts 4 are prevented from being withdrawn through the openings 5 by the retainer elements 6, as indicated most clearly in Fig. 4. The retainer elements 6 exert a binding action on the nuts 4 and may be of a resilient nature to prevent any possible loosening of the nuts or bolts and as a result the fastening is secure against casual displacement.

Having thus fully described our invention, what we claim as new and desire to secure by Letters Patent is:—

1. Means for securing a member to sheet metal, the rear side of which is not readily accessible, the same consisting of a bolt adapted to pass through registering openings in the member and sheet metal, a nut on the bolt and adapted to pass through the opening formed in the sheet metal and a retainer element having a part confined between the member and sheet metal and passing through the opening of the latter and confined against the rear side thereof by the nut.

2. Means for securing a plate having a pair of openings formed therein to sheet metal provided with a pair of registering openings, bolts passing through the openings of the plate and sheet metal, nuts on the bolts and adapted to pass through the openings of the sheet metal and a strip confined between the plate and sheet metal and having its end portions bent and passing through the openings of the sheet metal and confined against the rear side thereof by the said nuts.

3. Means for securing a member to sheet metal which is not readily accessible in the rear, the member and sheet metal having registering openings, bolts passing through the openings of the parts, nuts on the bolts and adapted to pass through the openings of the sheet metal and an element confined between the member and sheet metal and having retainer elements passing through the openings of the sheet metal and confined against the rear side thereof by the said nuts.

In testimony whereof we affix our signatures in presence of two witnesses.

CHARLES H. LANE.
JOHN H. STEELE.

Witnesses:
ARTHUR H. LEWIS,
JAS. B. FINNIGAN.